United States Patent
Li et al.

(10) Patent No.: US 10,900,136 B2
(45) Date of Patent: Jan. 26, 2021

(54) ADDITIVE-BASED ELECTROFORMING MANUFACTURING METHODS AND METALLIC ARTICLES PRODUCED THEREBY

(71) Applicant: HONEYWELL INTERNATIONAL INC., Morris Plains, NJ (US)

(72) Inventors: Qiang Li, Shanghai (CN); Gangmin Cao, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 571 days.

(21) Appl. No.: 15/653,208

(22) Filed: Jul. 18, 2017

(65) Prior Publication Data
US 2019/0024251 A1 Jan. 24, 2019

(51) Int. Cl.
*C25D 1/02* (2006.01)
*B29C 64/40* (2017.01)
(Continued)

(52) U.S. Cl.
CPC ............ *C25D 1/02* (2013.01); *B22F 3/1055* (2013.01); *B23P 15/02* (2013.01); *B29C 64/153* (2017.08);
(Continued)

(58) Field of Classification Search
None
See application file for complete search history.

(56) References Cited

U.S. PATENT DOCUMENTS 3,939,046 A * 2/1976 Conn ................... C25D 1/00
205/73
5,435,902 A 7/1995 Andre, Sr.
(Continued)

FOREIGN PATENT DOCUMENTS

CN 103624985 B 1/2016
EP 3050651 A1 8/2016
(Continued)

OTHER PUBLICATIONS

Kain, A., et al.; High aspect ration-and 3D-printing of freestanding sophisticated structures, ScienceDirect Procedia Chemistry 1 (2009) 750-753.
(Continued)

*Primary Examiner* — Stefanie S Wittenberg
(74) *Attorney, Agent, or Firm* — Lorenz & Kopf, LLP

(57) ABSTRACT

Additive-based electroforming manufacturing methods for producing turbomachine components and other metallic articles are provided, as are metallic articles manufactured utilizing such manufacturing methods. In various embodiments, the method includes the step or process of additively manufacturing a sacrificial tooling structure having a component-defining surface region. A metallic body layer or shell is deposited over the component-defining surface region utilizing an electroforming process such that a geometry of the component-defining surface region is transferred to the body layer. The tooling structure is chemically dissolved, thermally decomposed, or otherwise removed, while the metallic body layer is left substantially intact. After tooling structure removal, the metallic body layer is further processed to complete fabrication of the metallic component. In certain implementations, the method may further include the step or process of depositing an electrically-conductive base coat over the component-defining surface (Continued)

region of the tooling structure for usage in the subsequently-performed electroforming process.

12 Claims, 3 Drawing Sheets

(51) Int. Cl.
*C25D 1/20* (2006.01)
*C25D 1/00* (2006.01)
*B22F 3/105* (2006.01)
*B29C 64/153* (2017.01)
*B33Y 10/00* (2015.01)
*B33Y 80/00* (2015.01)
*B23P 15/02* (2006.01)
*B22F 3/24* (2006.01)
*B22F 5/10* (2006.01)
*C23F 1/00* (2006.01)
*B22F 5/00* (2006.01)
*F01D 5/22* (2006.01)
*F01D 5/28* (2006.01)
*F01D 9/02* (2006.01)
*F01D 25/24* (2006.01)
*F23R 3/00* (2006.01)

(52) U.S. Cl.
CPC ............ *B29C 64/40* (2017.08); *B33Y 10/00* (2014.12); *B33Y 80/00* (2014.12); *C25D 1/00* (2013.01); *C25D 1/20* (2013.01); *B22F 5/009* (2013.01); *B22F 2003/242* (2013.01); *B22F 2003/247* (2013.01); *B22F 2005/103* (2013.01); *B22F 2998/10* (2013.01); *B22F 2999/00* (2013.01); *B23P 2700/13* (2013.01); *C23F 1/00* (2013.01); *F01D 5/225* (2013.01); *F01D 5/288* (2013.01); *F01D 9/02* (2013.01); *F01D 25/24* (2013.01); *F05D 2220/32* (2013.01); *F05D 2230/31* (2013.01); *F23R 3/002* (2013.01)

(56) References Cited

U.S. PATENT DOCUMENTS

| | | | |
|---|---|---|---|
| 5,775,402 A | 7/1998 | Sachs et al. | |
| 5,891,317 A * | 4/1999 | Teichmann | C25D 1/02 |
| | | | 205/50 |
| 6,004,447 A | 12/1999 | Bischoping et al. | |
| 6,112,804 A | 9/2000 | Sachs et al. | |
| 6,354,361 B1 | 3/2002 | Sachs et al. | |
| 6,363,606 B1 | 4/2002 | Johnson, Jr. et al. | |
| 6,409,902 B1 | 6/2002 | Yang et al. | |
| 6,519,500 B1 | 2/2003 | White | |
| 7,448,121 B1 | 11/2008 | Hung | |
| 9,427,835 B2 | 8/2016 | Cheung et al. | |
| 2005/0230261 A1* | 10/2005 | Cohen | C25D 5/022 |
| | | | 205/118 |
| 2006/0118990 A1 | 6/2006 | Dierkes et al. | |
| 2007/0134908 A1* | 6/2007 | Banham | F28F 13/08 |
| | | | 438/619 |
| 2008/0318189 A1 | 12/2008 | Brodkin et al. | |
| 2010/0101961 A1 | 4/2010 | Lee et al. | |
| 2014/0093384 A1* | 4/2014 | Mironets | B23P 15/006 |
| | | | 205/73 |
| 2014/0335441 A1* | 11/2014 | Tsukamoto | H01G 11/68 |
| | | | 429/522 |
| 2016/0001407 A1 | 1/2016 | Hansen et al. | |
| 2016/0024637 A1* | 1/2016 | Nakano | C23C 10/04 |
| | | | 428/610 |
| 2016/0047029 A1 | 2/2016 | Fairbourn | |
| 2016/0144602 A1 | 5/2016 | Levasseur et al. | |
| 2016/0145747 A1 | 5/2016 | Watson et al. | |
| 2016/0145755 A1 | 5/2016 | Cook | |
| 2016/0158514 A1 | 6/2016 | Stoeber et al. | |
| 2016/0159488 A1 | 6/2016 | Roach et al. | |
| 2016/0160863 A1 | 6/2016 | Roach et al. | |
| 2016/0208624 A1 | 7/2016 | Smith | |
| 2016/0315035 A1 | 10/2016 | Marchist | |
| 2017/0050271 A1 | 2/2017 | Wendt et al. | |

FOREIGN PATENT DOCUMENTS

| | | | |
|---|---|---|---|
| GB | 2508378 A | 6/2014 | |
| WO | 2015/006487 A1 | 1/2015 | |
| WO | 2016044712 A1 | 3/2016 | |
| WO | WO2016044712 * | 3/2016 | ............ B23B 15/04 |

OTHER PUBLICATIONS

Kobliska, J., et al.; Rapid fabrication of smart tooling with embedded sensors by casting in molds made by three dimensional printing.

Mccarthy, D.L.; Creating complex hollow metal geometries using additive manufacturing and metal; 2012.

Mccarthy, D.L., et al.; Creating complex hollow metal geometries using additive manufacturing and electroforming; 2012.

Extended EP Search Report for Application No. 18183570.3 dated Dec. 13, 2018.

Cook, Alan M., et al. "3D-Printed Mold Electroforming for Microfabrication of W-band TWT Circuits," 2017 Eighteenth International Vacuum Electronics Conference (IVEC), IEEE, Apr. 24, 2017.

Monzon, M.D., et al. "Nickel-Copper Electroforming Process Applied to Rotational Mould Starting from Additive Manufacturing," Transactions of the Institute of Metal Finishing, vol. 94, No. 3, May 3, 2016.

* cited by examiner

ADDITIVE-BASED ELECTROFORMING MANUFACTURING METHODS AND METALLIC ARTICLES PRODUCED THEREBY

TECHNICAL FIELD

The present invention relates generally to electroforming and, more particularly, additive-based electroforming manufacturing methods for producing metallic articles, as well as to turbomachine components and other metallic articles manufactured by such processes.

Abbreviations

AM—Additive Manufacturing or Additively Manufactured;
CAD—Computer Aided Design;
CMP—Chemical Mechanical Planarization or Polishing;
CVD—Chemical Vapor Deposition;
DMLS—Direct Metal Laser Sintering;
EBC—Environmental Barrier Coating;
FFF—Fused Filament Fabrication;
GTE—Gas Turbine Engine;
IGV—Inlet Guide Vane;
MCrAlY—a material containing chromium, aluminum, yttrium, and "M" as its primary constituents by weight, wherein "M" is nickel, cobalt, or a combination thereof;
SLA—Stereolithography;
TBC—Thermal Barrier Coating;
USD—United States Dollars;
vol %—volume percentage;
wt %—weight percentage;
YSZ—Yttria-Stabilized Zirconia; and
3D—three dimensional.

BACKGROUND

Turbomachine components are often characterized by relatively complex, thin-walled geometries. Extensive efforts have been expended in optimizing the geometries of turbomachine components, while satisfying critical mission requirements, prolonging operational lifespans, and maintaining lightweight designs for flight applications. Turbomachine components are commonly fabricated from superalloy materials having enhanced properties at elevated temperatures found within the chemically-harsh turbomachine environment. Additionally, specialized coatings or multilayer coating systems may be formed over selected component surfaces for added thermal or environmental barrier protection, particularly when such surface are exposed to core gas flow during turbomachine operation. Examples of high temperature coating and coating systems include EBCs, TBCs, and aluminide coatings of the type commonly formed over the aerodynamically-streamlined or contoured surfaces of rotor blades, nozzle vanes, rotor shrouds, and other GTE components. The stringent design parameters and demanding performance requirements placed on GTE components and, more broadly, on turbomachine components, taken in conjunction with low volume production, often result in undesirably high manufacturing costs and lengthy production cycles during component manufacture.

A continued industry demand thus exists for the development of methods by which turbomachine components can be manufactured in more efficient and cost effective manners, even when such components are produced in relatively low quantities. Embodiments of such manufacturing methods would ideally support the precision production of GTE components and other turbomachine components having relatively complex, thin-walled constructions. Additionally, it would be desirable for such manufacturing methods to enable turbomachine component fabrication from superalloy materials and to facilitate the formation of high temperature coatings over selected component surfaces, as desired. Finally, and more generally, it would be desirable for such manufacturing methods to be amenable to the production of various other types of metallic articles including, but not limited to, other types of aerospace components. Embodiments of such manufacturing methods are provided herein, as are metallic components produced in accordance with such manufacturing methods. Other desirable features and characteristics of embodiments of the present invention will become apparent from the subsequent Detailed Description and the appended Claims, taken in conjunction with the accompanying drawings and the foregoing Background.

BRIEF SUMMARY

Methods for manufacturing metallic components, such as turbomachine components having relatively thin-walled constructions, are provided. The disclosed manufacturing method combine additive manufacturing techniques and electroforming processes to fabricate metallic components at reduced manufacturing costs and abbreviated production cycle times, particularly in the context of low volume production. In various embodiments, the component manufacturing method includes the step or process of additively manufacturing a sacrificial tooling structure having a component-defining surface region. A metallic body layer is deposited over the component-defining surface region utilizing an electroforming process, with the geometry or shape of the surface region transferred to the metallic body layer. At a suitable juncture following deposition of the metallic body layer, the sacrificial tooling structure is chemically dissolved, thermally decomposed, or otherwise removed, while the metallic body layer is left substantially intact. The metallic body layer is then further processed to complete fabrication of the metallic component, which may predominately consist of the metallic body layer by vol % in embodiments. In certain implementations, such as when the sacrificial tooling structure is fabricated from a dielectric material or a material having relatively poor electrical conductivity, the component manufacturing method may further include the step or process of depositing an electrically-conductive base coat over the component-defining surface region of the sacrificial tooling structure for usage in plating the metallic body layer during the subsequently-performed electroforming process.

In other embodiments, the component manufacturing method includes the step or process of applying an electrically-conductive coating layer over a portion of a sacrificial tooling structure. The electrically-conductive coating layer is then energized during a subsequently-performed electroforming process, which is utilized to deposit or plate a metallic shell over the sacrificial tooling structure and onto the coating layer. The metallic shell encases, surrounds, or coats the sacrificial tooling structure, in whole or in substantial part. After deposition of the metallic shell, the sacrificial tooling structure is removed through at least one opening in the metallic shell. The metallic shell is then further processed to yield the completed metallic article. The electrically-conductive coating layer may or may not be stripped and, thus, may or may not be present in the completed metallic article. In implementations in which the metallic article assumes the form of a turbomachine or GTE component, the component manufacturing method may further include: (i) selecting the sacrificial tooling structure to have an airfoil-defining region; and (ii) forming the metallic shell to extend over the airfoil-defining region and thereby define at least one airfoil contained in the completed GTE component. In other implementations in which the metallic article assumes the form of a GTE component, the method may further include: (i) selecting the sacrificial tooling structure to have a flow passage-defining region; and (ii) forming the metallic shell to extend over the flow passage-defining region and thereby impart the metallic shell with a flow passage through which gas flow is conducted when the GTE component is utilized within a GTE.

Embodiments of metallic components or workpieces are further provided, which are fabricated in accordance with the disclosed manufacturing methods. In embodiments, the metallic component includes a plated body layer; a central void, such as an unfilled air cavity or flow passage, substantially surrounded and defined by the plated body layer; and an opening formed in the plated body layer through which the central void is exposed from the exterior of the metallic component. The metallic component may be predominately composed of the plated body layer by vol % in at least some implementations. Furthermore, in certain instances, the metallic component may further include an electrically-conductivity coating layer, which lines interior surfaces of the plated body layer defining the central voids. The metallic body layer is usefully, but not necessarily formed to have a global average thickness at least twice the global average thickness of the electrically-conductive coating layer, when present. In further implementations, the metallic component may also contain an airfoil portion defined, in whole or in substantial part, by the plated body layer. In such implementations, the central void may assume the form of an internal cavity within the metallic component.

The internal cavity may be surrounded by the airfoil portion, as taken about a longitudinal axis of the airfoil portion, while the opening may be formed inboard or outboard of the airfoil portion, as further taken along the longitudinal axis.

Various additional examples, aspects, and other useful features of embodiments of the present disclosure will also become apparent to one of ordinary skill in the relevant industry given the additional description provided below.

BRIEF DESCRIPTION OF THE DRAWINGS

At least one example of the present invention will hereinafter be described in conjunction with the following figures, wherein like numerals denote like elements, and.

Figure 1:
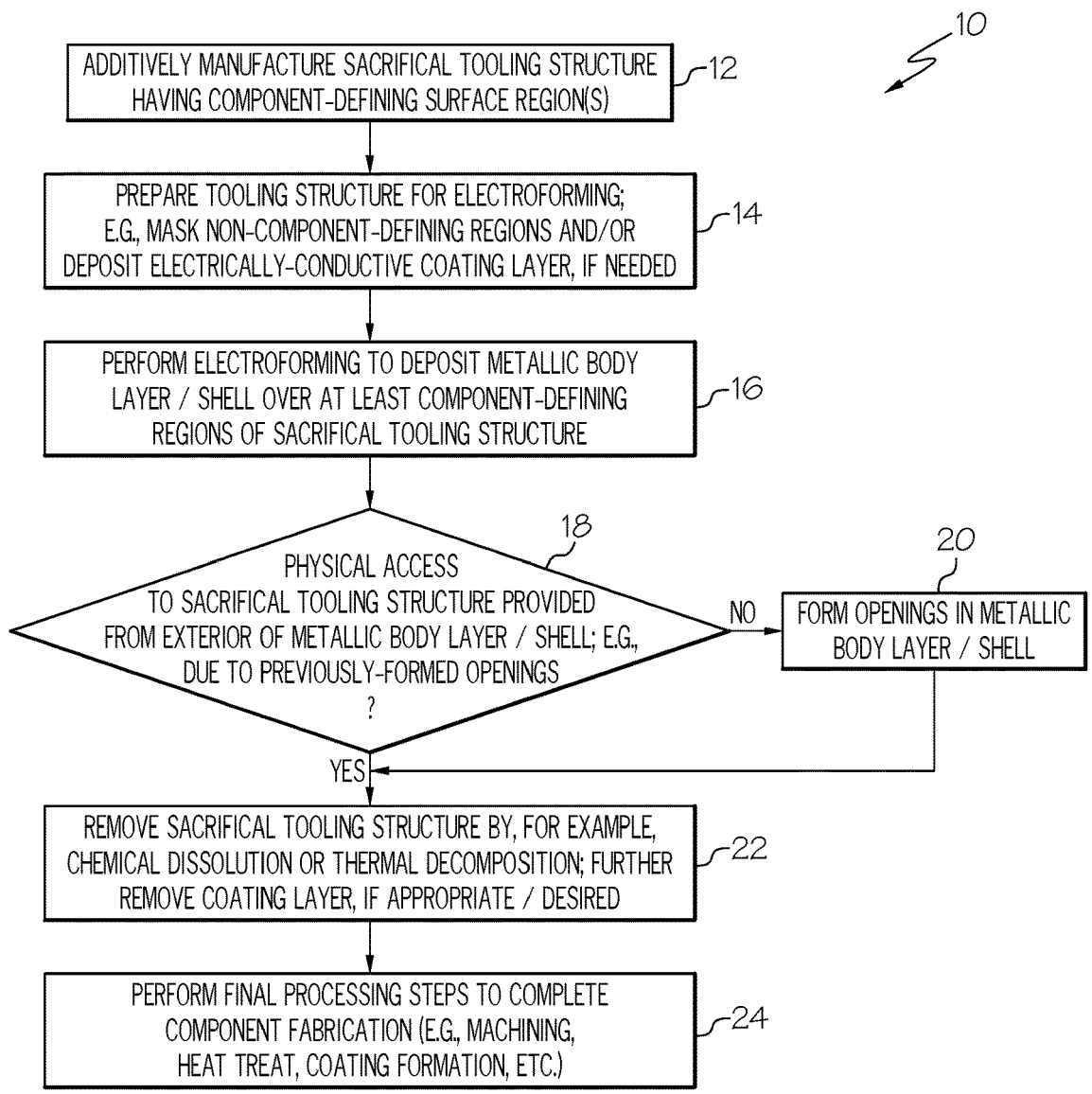
FIG. 1 is a flowchart setting-forth an exemplary additive-based electroforming process for manufacturing a metallic component, such as a turbomachine component having a relatively thin-walled or hollow construction, as illustrated in accordance with an exemplary embodiment of the present disclosure.

For simplicity and clarity of illustration, the drawing figures illustrate the general manner of construction, and descriptions and details of well-known features and techniques may be omitted to avoid unnecessarily obscuring the exemplary and non-limiting embodiments described in the subsequent Detailed Description. It should further be understood that features or elements appearing in the accompanying figures are not necessarily drawn to scale unless otherwise stated. For example, the dimensions of certain elements or regions in the figures may be exaggerated relative to other elements or regions to improve understanding of embodiments of the disclosure.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description. The term "exemplary," as appearing throughout this document, is synonymous with the term "example" and is utilized repeatedly below to emphasize that the following description provides only multiple non-limiting examples of the invention and should not be construed to restrict the scope of the invention, as set-out in the Claims, in any respect. Finally, as appearing herein, the terms "on" and "over" generally describe a spatial relationship between a first structural element (e.g., a deposited or plated layer) that overlies, underlies, or is otherwise generally supported by a second structural element (e.g., another deposited layer or a component body). Such terms do not require intimate or direct physical contact between the first and second structural elements unless otherwise expressly stated.

OVERVIEW

The following describes additive-based electroforming manufacturing methods for fabricating articles of manufacture, structures, or workpieces predominately composed of metallic materials. Such articles of manufacture, structures, or workpieces are broadly referred to herein as "metallic components," with this term encompassing all articles of manufacture predominately composed of one or more metallic materials by wt %. The term "metallic component" thus does not preclude the possibility that the below-described components may include certain regions or portions composed of non-metallic materials, such as ceramic or organic materials utilized for cavity backfill or coating formation purposes. In many instances, the below-described metallic components will be characterized by a hollow or partially hollow construction. In this case, the metallic component may include a wall or shell, which extends in three dimensions around a flow passage, an internal cavity, or other void that is centrally located within the component, generally considered (herein, a "central void"). The below-described manufacturing methods may be particularly useful in the fabrication of aerospace and turbomachine components, which have relatively thin-walled or shell-like constructions and which are predominately composed of superalloy materials. This notwithstanding, embodiments of the manufacturing method are not restricted to usage within any particular industry or to the production of any particular type of metallic component.

The below-described manufacturing methods leverage unique combinations AM processes and electroforming techniques to produce metallic components. The AM processes are employed to initially fabricate a consumable or sacrificial tooling structure, which has at least one surface region generally defining the desired geometry of the completed metallic component (herein, "component-defining surface regions"). Comparatively, electroforming is utilized to plate or deposit a metallic body layer or metallic shell over the sacrificial tooling structure and, specifically, over the component-defining surface region(s) of the tooling structures. Post electroforming, the sacrificial tooling structure is chemically dissolved, thermally decomposed, or otherwise removed, while the metallic body layer is left substantially intact. Final processing is then performed to complete fabrication of the metallic component. Final processing can include, for example, machining to define the more detailed structural features of the completed metallic component, polishing or grinding to thin or refine the surface finish of selected component regions, the formation of high temperature coatings or multilayer coating systems over selected component surfaces, the performance of heat treatment processes, and so on. The end result is a metallic component having relatively thin-walled, lightweight, and structurally-robust construction, which can be produced with abbreviated cycle times and at reduced production costs as compared to conventional manufacturing methods, such as investment casting.

In certain embodiments, such as when the sacrificial tooling structure is composed of a dielectric material or another material having relatively poor electrical conductivity, an electrically-conductive coating layer may be applied to selected surfaces of the sacrificial tooling structure prior to electroforming. In this manner, the electrically-conductive coating layer can serve as an electrode (e.g., cathode) layer during the subsequently-performed electroforming process; e.g., the electrically-conductive coating layer may be energized during electroforming along with one or more anodes, while the sacrificial tooling structure is at least partially submerged in plating solution to gradually compile or plate the metallic body layer over non-masked regions of the coating layer. After electroforming, the electrically-conductive coating layer may then be stripped away by, for example, contact with a suitable etchant. Alternatively, the electrically-conductive coating layer may be left intact for the duration of the manufacturing process and consequently remain in the completed metallic component. In such embodiments, the electrically-conductive coating layer can potentially contribute additional functionality to the completed metallic component. For example, the coating layer can be formulated and/or further processed to form or help form a high temperature coating or multilayer coating system over selected surfaces of the metallic component. This may be particularly useful when the metallic component assumes the form of a turbomachine component, such as a GTE component bathed in core gas flow during engine operation, as discussed more fully below in conjunction with FIG. 7. An exemplary embodiment of the additive-based electroforming manufacturing method will now be described in conjunction with FIGS. 1-6.

Examples of the Additive-Based Electroforming Manufacturing Method

FIG. 1 is a flowchart providing an additive-based electroforming manufacturing method 10 for fabricating metallic components, as illustrated in accordance with an exemplary and non-limiting embodiment of the present disclosure. As can be seen, additive-based electroforming manufacturing method 10 includes a number of sequentially-performed process steps identified as "STEPS 12, 14, 16, 18, 20, 22, 24." Depending upon the particular manner in which additive-based electroforming manufacturing method 10 is implemented, each step generically illustrated in FIG. 1 may entail a single process or multiple sub-processes. Furthermore, the process steps illustrated in FIG. 1 and described below are provided by way of non-limiting example only. In alternative embodiments of manufacturing method 10, additional process steps may be performed, certain steps may be omitted, and/or the illustrated steps may be performed in alternative sequences.

Figure 2:
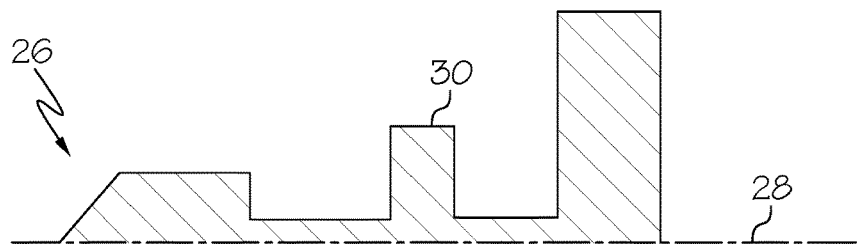
FIGS. 2-6 are simplified cross-sectional views illustrating a generalized metallic component, as fabricated in accordance with the exemplary component manufacturing method set-forth in FIG. 1 and shown at various stages of completion.

Additive-based electroforming manufacturing method 10 commences at STEP 12 (FIG. 1) with the additive production of a consumable or sacrificial tooling structure. As appearing herein, the term "additive manufacturing" and the corresponding abbreviation "AM" refer to computer-controlled manufacturing methods during which articles of manufacture are gradually built-up or compiled on a layer-by-layer basis in accordance with computer-readable design data, such as a computer-generated CAD model. The term "AM processes" thus encompasses 3D printing processes including, but not limited to, SLA, FFF, and targeted sintering (e.g., DMLS) processes. An example of a consumable or sacrificial tooling structure, which may be fabricated during STEP 12 of manufacturing method 10, is shown in FIG. 2 and identified by reference numeral "26." In this relatively simple example, sacrificial tooling structure 26 is shown in cross-section and is generally axisymmetric about a centerline 28. In further embodiments, sacrificial tooling structure 26 may assume various other forms and may or may not be axisymmetric about centerline 28.

As shown in FIG. 2, sacrificial tooling structure 26 is purposefully depicted in highly generalized manner to emphasize that tooling structure 26 can assume a wide range of geometric shapes and dimensions. Generally, the shape and dimensions of tooling structure 26 (or at least those regions of structure 26 have surface geometries desirably imparted to the completed metallic component) will be determined, at least in substantial part, by the established design of the metallic components to be fabricated utilizing manufacturing method 10 (FIG. 1). As indicated above, and as discussed more fully below, at least a portion of outer surface 30 of sacrificial tooling structure 26 has a surface geometry, contour, or topology desirably transferred to the completed metallic component fabricated via method 10. Such portions of outer surface 30 are referred to herein as the "component-defining surface regions" of sacrificial tooling structure 26. In various embodiments, a majority and, perhaps, the substantial entirety of outer surface 30 of sacrificial tooling structure 26, as measured by surface area, may serve as one or more component-defining surface regions of tooling structure 26. The particular regions of outer surface 30 that serve as the component-defining surface regions in the present example will become apparent from the following description and the accompanying drawing figures (particularly, FIGS. 2-6).

Sacrificial tooling structure 26 can be fabricated utilizing various different AM techniques and, in certain instances, a combination of AM techniques. Broadly stated, sacrificial tooling structure 26 can be fabricated utilizing various different processes capable of gradually compiling or building-up tooling structure 26 on a layer-by-layer basis in accordance with CAD data files or other computer-readable object data. A non-exhaustive list of suitable processes includes FFF AM processes, SLA processes, and targeted sintering (e.g., DMLS) processes. In many cases, the chosen AM process involves heating a source material supplied as a filament (wire), powder bed, or actively-flowed powder utilizing one or more sources of targeted heat input, such a laser or an electron beam. The heat source may be controlled to fuse targeted regions of the source material in accordance with the computer-readable object data (e.g., CAD) files to gradually build-up or successively compile tooling structure 26 in accordance with a pre-established design. If desired, and depending upon the capabilities of the AM machine or apparatus employed to carry-out the AM process, multiple sacrificial tooling structures may be fabricated in parallel; e.g., a two dimensional grid or array of tooling structures can be fabricated concurrently for increased process efficiency.

Sacrificial tooling structure 26 can be produced from various different materials. It is generally advantageous for the selected material or materials to be commercially available at relatively low cost, well-suited for usage with chosen AM process, and to lend well to selective removal (e.g., chemical dissolution or thermal decomposition) during the removal process conducted at STEP 22 of manufacturing method 10 (FIG. 1). Candidate materials include organic polymers, such as plastics and waxes, which are amenable to removal by thermal decomposition. Other candidate materials include metallic materials, which can be preferentially removed with high selectivity by etching or chemical dissolution. Such materials may include aluminum-based materials (that is, materials consisting essentially of aluminum or containing aluminum as a primary constituent by wt %) and zinc-based materials (that is, materials consisting essentially of zinc or containing zinc as a primary constituent by wt %). In certain implementations, sacrificial tooling structure 26 may be fabricated utilizing multiple materials, which include at least one dielectric material and at least one co-deposited electrically-conductive material. For example, a 3D printer capable of dual material printing may be utilized to produce sacrificial tooling structure 26 in at least some implementations. In this manner, sacrificial tooling structure 26 can be printed to contain electrically-conductive regions over which plating occurs, as well as dielectric regions over which plating does not occur (or at least occurs to a lesser extent) during the below-described electroforming process.

Referring jointly to FIGS. 1 and 2, additive-based electroforming manufacturing method 10 continues with the preparation of sacrificial tooling structure 26 for electroforming (STEP 14, FIG. 1). Preparation of sacrificial tooling structure 26 can involve the application of one or more electrically-conductive coating layers onto tooling structure 26, the application of masking layers over selected regions of tooling structure 26 and/or the below-described electrically-conductive coating layers, surface treatment steps for improved surface finish or smoothness, and/or other process steps. Addressing first the application of masking layers, a selected masking material may be applied to the selected regions of outer surface 30 of sacrificial tooling structure 26 to prevent or at least minimize the accumulation of plating material (as forming the below-described metallic body layer) during electroforming. In such cases, the masking material may composed of a dielectric material, which can be applied utilizing any various different deposition techniques. Further, in implementations in which one or more electrically-conductive coating layers are formed over sacrificial tooling structure 26, as described below in conjunction with STEP 14 of manufacturing method 10, masking may be applied to similarly prevent or at least deter deposition of the coating layers over selected regions of tooling structure 26.

During STEP 14 of additive-based electroforming manufacturing method 10 (FIG. 1), one or more electrically-conductive coating layers may be deposited to facilitate the subsequently-performed electroforming process. In this case, an electrically-conductive coating layers may be deposited over at least the component-defining surface regions of sacrificial tooling structure 26 when tooling structure 26 is composed of a dielectric material, a material having a relatively low electrical conductivity, or a material that is otherwise poorly suited for usage as an electrode (cathode) layer during electroforming. Again, when it is desired to apply such a coating layer, the electrically-conductive coating layer is applied over at least the component-defining surface regions of sacrificial tooling structure 26 (STEP 16). Suitable deposition techniques include, but are not limited to, spray deposition techniques, painting, vapor deposition techniques, and electroless plating of metallic materials. Suitable materials include copper-based materials and nickel-based materials; that is, materials containing or consisting essentially of copper and nickel, respectively, as considered by wt %. The average global thickness of the electrically-conductive coating layer, when applied, can vary from about 0.2 microns (µm) to about 50 µm and, perhaps, between about 0.5 and about 10 µm in implementations; the term "about," as appearing throughout this document, denoting a disparity of less than 10%. In further implementations, the coating thickness may be greater than or less than the aforementioned range.

In embodiments in which an electrically-conductive coating layer is formed over sacrificial tooling structure 26 for usage as an electrode layer during electroforming, the coating layer may or may not be stripped during subsequent stages of manufacturing and, therefore, may or may not be present in the completed metallic component ultimately fabricated utilizing manufacturing method 10 (FIG. 1). When such an electrically-conductive coating layer is desirably formed over sacrificial tooling structure 26 and is not subsequently removed, there arises an opportunity to leverage the coating layer to contribute additional structural or functional characteristics to the completed metallic component. This may be useful in the context of turbomachine components, such as GTE components, having surfaces over which high temperature coatings or multilayer coating systems are desirably produced. Thus, when manufacturing method 10 is utilized to fabricate such GTE components, the electrically-conductive coating layer may be deposited to have a composition suitable for usage in the formation of such high temperature coatings or multilayer coating systems. As a first example, the electrically-conductive coating layer may be composed of an aluminum-based material and utilized in the formation of an aluminide coating over gas-exposed surfaces of the GTE component. As a second example, the electrically-conductive coating layer may be composed of a MCrAlY alloy and serve as a bond coat for a subsequently-deposited EBC or TBC, such as a YSZ topcoat layer. Further description in this regard is provided below in conjunction with FIG. 7.

Figure 3:
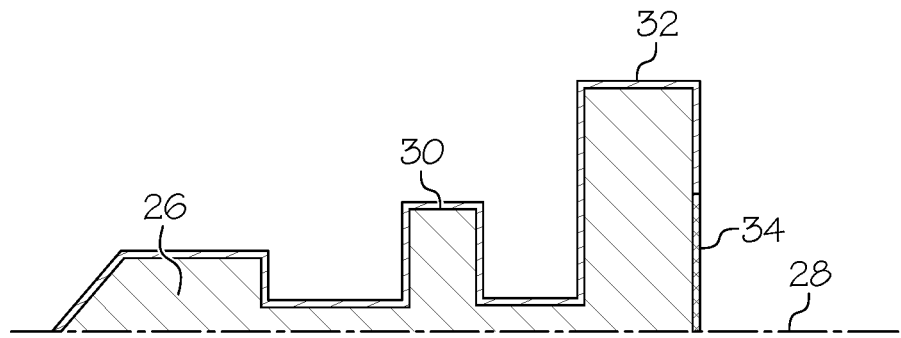

With reference to FIG. 3, sacrificial tooling structure 26 is illustrated after deposition of an electrically-conductive coating layer 32 and a dielectric masking layer 34 over selected surfaces of tooling structure 26, as applied in accordance with STEP 14 of manufacturing method 10 (FIG. 1). Although tooling structure 26, coating layer 32, and dielectric masking layer 34 are only partially shown in FIG. 3, all such structure elements or features may be assumed to be generally axisymmetric about centerline 28 for the purposes of the instant example. As can be seen, electrically-conductive coating layer 32 is deposited over the majority and, indeed, the substantial entirety of outer surface 30 of tooling structure 26, as considered by surface area.

Additionally, coating layer 32 is deposited in intimate physical contact with the component-defining surface regions of sacrificial tooling structure 26. Comparatively, dielectric masking layer 34 is deposited over a relatively limited region of sacrificial tooling structure 26, which does not contribute in a direct manner to the final geometry of the completed metallic component. Dielectric masking layer 34 is composed of a dielectric material and defines a plating keep-out or prevention region, which creates an opening in the metallic body layer post electroforming to facilitate removal of tooling structure 26, as described more fully below. In further embodiments, dielectric masking layer 34 need not be applied and such an opening may be created by material removal following electroforming. An electrically-conductive coating layer may not be applied in alternative implementations, such as when sacrificial tooling structure 26 is at least partially composed of an electrically-conductive material suitable for usage as an electrode during electroforming.

Turning next to STEP 16 of additive-based electroforming manufacturing method 10 (FIG. 1), an electroforming process is carried-out to deposit or electroplate a metallic body layer over sacrificial tooling structure 26. During electroforming, sacrificial tooling structure 26, electrically-conductive coating layer 32 (if present), and dielectric masking layer 34 (if present) are partially or wholly submerged in a plating solution or bath. At least one consumable or non-consumable anode may be positioned in proximity of sacrificial tooling structure 26, coating layer 32, and/or dielectric masking layer 34. An electrical potential is applied to gradually deposit the plated metallic layer over the appropriate surfaces of sacrificial tooling structure 26. Although this need not be the case in all embodiments, the plated metallic layer will often constitute the volumetric majority of the metallic component in its completed form and is consequently referred to herein as a "metallic body layer." The electroforming process may be continued until the metallic body layer is built-up to a global average thickness sufficient to enable the body layer to be self-supporting or freestanding after removal tooling structure 26, noting that some degree of physical support may also be provided electrically-conductive coating layer 32 when present.

Figure 4:
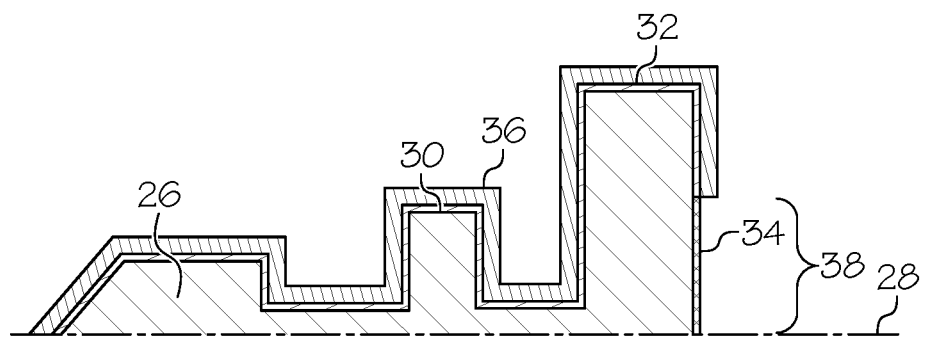

FIG. 4 illustrates sacrificial tooling structure 26 and electrically-conductive coating layer 32 after deposition of a metallic body layer 36 over selected regions of tooling structure 26. Here, metallic body layer 36 does not directly or intimately contact sacrificial tooling structure 26, but rather is deposited onto and intimately contacts electrically-conductive coating layer 32. Nonetheless, as the outer geometry of the component-defining surface regions of tooling structure 26 is imparted to electrically-conductive coating layer 32, so too is the geometry of the component-defining surface regions of tooling structure 26 transferred to metallic body layer 36. In alternative embodiments in which electrically-conductive coating layer 32 is absent, metallic body layer 36 may be deposited directly onto and intimately contact outer surface 30 of tooling structure 26. Metallic body layer 36 is formed around sacrificial tooling structure 26 in the illustrated example such that body layer 36 substantially encases, encloses sheathes tooling structure 26, as well as electrically-conductive coating layer 32. In such embodiments, metallic body layer 36 may be referred to as a "metallic shell," which is formed over and around tooling structure 26.

The composition and thickness of metallic body layer/shell 36 will vary amongst embodiments. In embodiments in which manufacturing method 10 is utilized to produce aerospace or turbomachine (e.g., GTE) components, metallic body layer/shell 36 may be composed of a superalloy material, such as a nickel-based and cobalt-based superalloy. As indicated above, metallic body layer/shell 36 may be deposited to a thickness that is sufficiently robust so as to be self-supporting following removal of sacrificial tooling structure 26 and, perhaps, removal of electrically-conductive coating layer 32. In one embodiment, and by way of non-limiting only, metallic body layer/shell 36 may have a global average thickness that is greater than and, perhaps, at least twice that of coating layer 32. In certain implementations, metallic body layer/shell 36 may be deposited to have a global average thickness ranging between about 100 µm and about 10 millimeters (mm). In other implementations, the global average thickness of layer/shell 36 may be thicker or thinner than the aforementioned range. Metallic body layer/shell 36 may be deposited to have a substantially uniform or constant wall thickness or, instead, a variable wall thickness. In the latter regard, targeted regions of the metallic body layer/shell 36 may be imparted with a varied wall thickness by application of masking, through shaping or contouring of the anodes, and utilizing similar techniques affecting the local rate of plating deposition during electroforming. Additionally or alternatively, selected regions of metallic body layer/shell 36 may be locally thinned after electroforming by, for example, CMP, grinding, lapping, or the like.

At a suitable juncture following electroforming, sacrificial tooling structure 26 is removed in the manner indicated by STEPS 18, 20, 22 of manufacturing method 10 (FIG. 1). In instances in which metallic body layer/shell 36 surrounds or encases sacrificial tooling structure 26, one or more openings are desirably provided in body layer/shell 36 to permit physical access to tooling structure 26 facilitating tooling structure removal. Thus, as indicated in FIG. 1 at STEPS 18, 20, if such an opening or openings are not present in metallic body layer/shell 36 following electroforming, such openings may be created by laser drilling, targeted etching, or utilizing another material removal process. Alternatively, such an opening or openings may be created during the electroforming process in implementations in which build-up of the plating material over selected regions of sacrificial tooling structure 26 is prevented. Again, this may be accomplished by forming sacrificial tooling structure 26 (or portions thereof) from a dielectric material, by masking selected regions of tooling structure 26 or electrically-conductive coating layer 32 (when present), and/or by only partially submerging tooling structure 26 in the plating bath during electroforming. An example of such an opening 38, which is created during electroforming due to the presence of dielectric masking layer 34, is shown in FIG. 4.

At STEP 22 of additive-based electroforming manufacturing method 10 (FIG. 1), sacrificial tooling structure 26 is removed through opening 38 in metallic body layer/shell 36. Various different techniques can be employed for removing sacrificial tooling structure 26, as appropriate depending upon the composition of sacrificial tooling structure 26, the composition of metallic body layer/shell 36, the composition of electrically-conductive coating layer 32 (if present), the thermal tolerances of body layer/shell 36 and coating layer 32, and other such factors. If composed of an organic flammable material, sacrificial tooling structure 26 can be removed by controlled burning or thermal decomposition. Such a thermal decomposition can be carried-out within a furnace, oven, or the like and performed in an open air or controlled environment in accordance with a pre-established heating schedule. Alternatively, if composed of a chemically-dissolvable material, sacrificial tooling structure 26 can be chemically dissolved by treatment with a wet etchant, a dry etchant, or liquid solvent. In such embodiments, the selected etchant or solvent is usefully chosen to have a chemistry selective to the material of tooling structure 26 over the material of metallic body layer/shell 36 (if contacted by the etchant) and/or electrically-conductive coating layer 32 (if present). Agitation, heating, and/or active flushing can be applied to accelerate such a chemical dissolution process, as desired.

Figure 5:
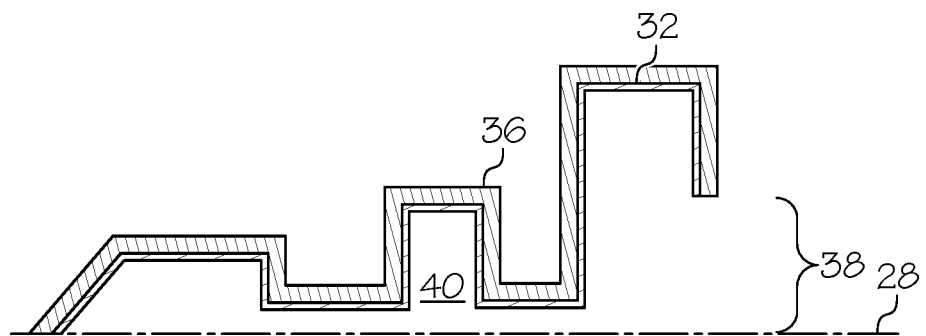

With continued reference to FIG. 1, electrically-conductive coating layer 32 may be stripped during STEP 22 of additive-based electroforming manufacturing method 10 (FIG. 1) in certain implementations. When desirably removed, and depending upon the respective composition of coating layer 32 and tooling structure 26, electrically-conductive coating layer 32 may be removed concurrently with sacrificial tooling structure 26 utilizing a single treatment step for enhanced process efficiency. Alternatively, a series of separate removal steps may be performed. As a still further possibility, electrically-conductive coating layer 32 may not be removed during manufacturing method 10 and may, instead, remain in the completed metallic component. This is indicated in FIG. 5, which illustrates metallic body layer 36 after removal of sacrificial tooling structure 26 during STEP 22 of manufacturing method 10 (FIG. 1). As can be seen, central void 40 has been created within metallic body layer/shell 36 due to the removal of tooling structure 26. As coating layer 32 is left substantially intact, electrically-conductive coating layer 32 lines central void 40. Stated differently, electrically-conductive coating layer 32 overlies those internal surfaces of body layer/shell 36 defining central void 40. As will be described more fully below, central void 40 may form an internal cavity, which is substantially enclosed by metallic body layer/shell 36, within the completed metallic component; or void 40 may ultimately form a flow passage through the completed metallic component.

Turning lastly to STEP 24 of additive-based electroforming manufacturing method 10 (FIG. 1), additional processing steps are performed to complete fabrication of the metallic component. Such additional process steps can include one or more machining steps, as indicated by symbol 42 in FIG. 6 wherein the metallic component is shown in a completed or nearly completed state and is consequently now identified by reference numeral "44." When performed, machining may define the more detailed features of metallic component 44, to bring certain dimensions of component 44 into conformance with design tolerances, to thin selected regions of component 44 for weight savings, and/or to otherwise refine the final geometry of component 44. Similarly, grinding, CMP, lapping, or the like may be conducted to improve surface finish across regions of metallic component 44, if desired. Various other processing techniques may also be performed during STEP 24 of manufacturing method 10 including, but not limited to, heat treatment, additional coating formation processes, and/or potential backfilling or sealing of central void 40. In certain embodiments, a separately-fabricated structure or body may be installed within void 40 to, for example, deliver cooling airflow to the interior of component 44 during usage thereof.

As previously stated, electrically-conductive coating layer 32 (if present) may be removed during STEP 24 in certain implementations of manufacturing method 10. Conversely, in embodiments in which coating layer 32 is present and remains in completed metallic component 44, and particularly when metallic component 44 assumes the form of a turbomachine or GTE component, electrically-conductive coating layer 32 may be utilized in the formation of a high temperature coating or coating system. As a specific example, when an aluminide coating is desirably formed over metallic body layer/shell 36, electrically-conductive coating layer 32 may be formed from an aluminum-based material. Following or substantially concurrently with tooling structure removal, heat treatment may be carried-out to diffuse aluminum, and possibly other constituents contained in coating layer 32 (e.g., platinum), into the parent material (e.g., superalloy) of metallic body layer/shell 36 and thereby form the desired aluminide coating. In other implementations in which metallic component 44 assumes the form of a GTE component, electrically-conductive coating layer 32 may be utilized as a bond coat. In such embodiments, coating layer 32 may be composed of a MCrAlY alloy or another material, and additional processes may be carried-out during STEP 24 of manufacturing method 10 to produce one or more coating layers (e.g., an EBC or TBC) over coating layer 32. In this case, such additional coating layers may be formed over cavity-facing surface 46 of coating layer 32 (FIG. 6) opposite metallic body layer/shell 36, with surface 46 possibly facing high temperature gas flow during engine operation, as discussed more fully below in conjunction with FIG. 7.

Figure 6:
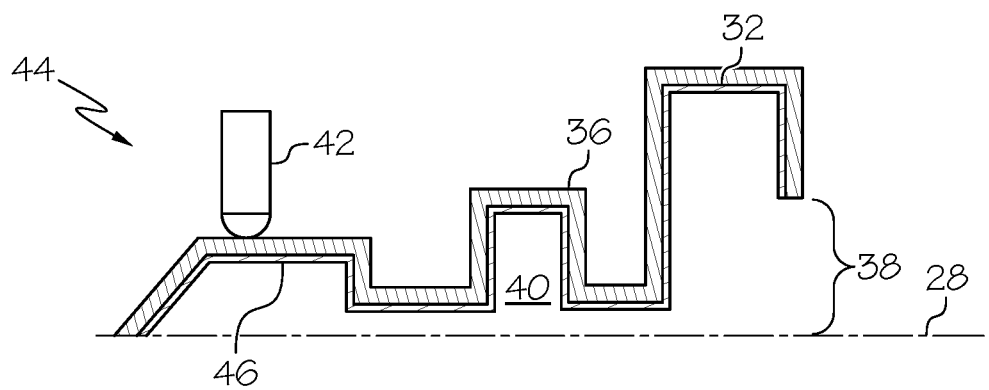

With continued reference to FIG. 6, metallic component 44 has a relatively thin-walled, hollow construction and is predominately composed of metallic body layer/shell 36 by vol %. Metallic body layer/shell 36 substantially encloses or surrounds central void 40, which is transected by and may be generally centered about centerline 28. Central void 40 will often be left as an unfilled air cavity in the finished component, although the possibility that void 40 may be backfilled or additional devices, bodies, or structures may be installed within void 40 is not precluded. Void 40 is lined by electrically-conductive coating layer 32 in the illustrated example and is accessible from the exterior of component 44 via opening 38, which is formed through metallic body layer/shell 36 and coating layer 32. In certain implementations, such as when metallic component 44 assumes the form of turbomachine component, metallic body layer/shell 36 may be composed of a superalloy material. In such embodiments, coating layer 32 may contain aluminum as a primary constituent by wt %. Central void 40 may exist as an enclosed cavity or hollow interior, which is substantially surrounded and enclosed by metallic body layer/shell 36. Alternatively, central void 40 may define a flow passage or conduit, which extends through metallic component 44 and is perhaps substantially coaxial with centerline 28. Additional discussion of GTE components beneficially produced utilizing manufacturing method 10 will now be provided in connection with FIG. 7.

Figure 7:
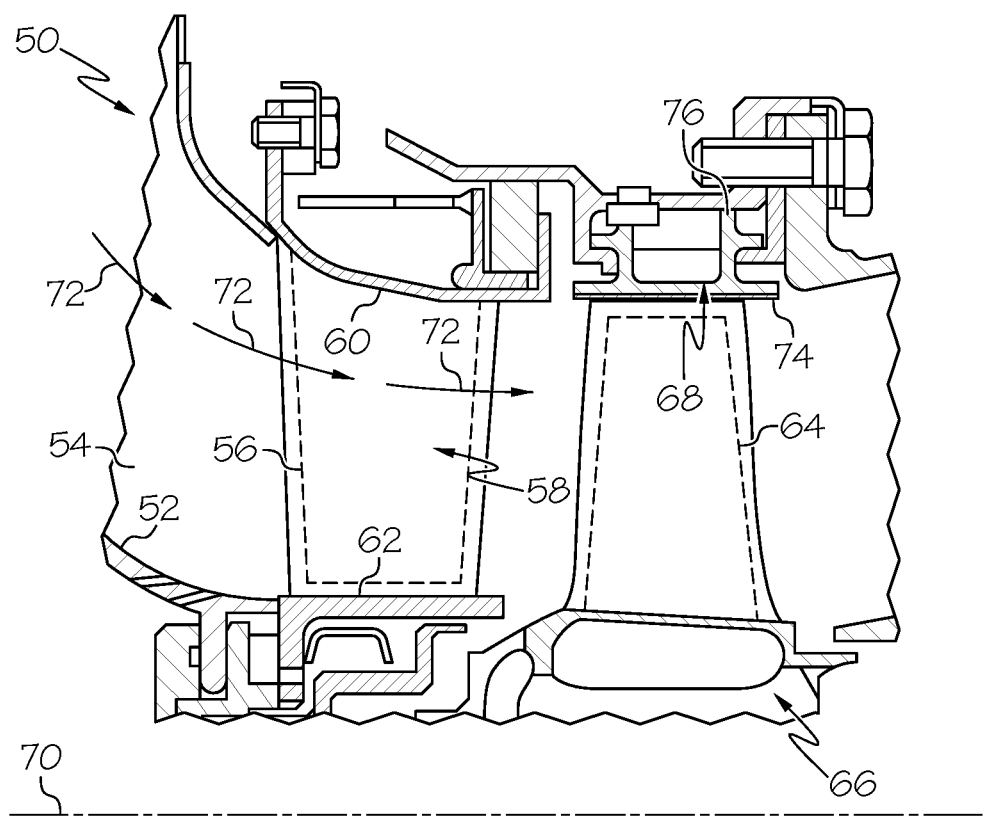
FIG. 7 is a cross-sectional view of a GTE (partially shown), which contains several components usefully fabricated utilizing the component manufacturing method of FIG. 1, as illustrated in accordance with an exemplary embodiment of the present disclosure.

Examples of GTE Components Usefully Fabricated in Embodiments of the Manufacturing Method FIG. 7 is a cross-sectional schematic of a GTE 50, which is partially shown and which is illustrated in accordance with an exemplary embodiment of the present disclosure. The illustrated portion of GTE 50 contains several examples of metallic (e.g., superalloy) components potentially fabricated utilizing additive-based electroforming manufacturing method 10, as described above in conjunction with FIG. 1. These metallic GTE components include: (i) a combustor liner 52, as included in a combustor 54 (only the outlet end of which is shown); (ii) a nozzle vane 56, as included in a turbine nozzle 58; (iii) an outer annular endwall 60 and inner annular endwall 62, as further included in turbine nozzle 58; (iv) a rotor blade 64, as included in a turbine rotor 66; and (v) a turbine rotor shroud 68 surrounding or circumscribing turbine rotor 66. As will be appreciated, many of the foregoing components (e.g., combustor liner 52, endwalls 60, 62, and shroud 68) are generally axisymmetric about engine rotational axis or centerline 70, while other components are repeated multiple times within GTE 50 and angularly spaced about centerline 70 (e.g., vane 56 and blade 64). The foregoing components are listed by way of non-limiting example only, with the understanding that embodiments of manufacturing method 10 can be utilized to produce various other types of GTE components in addition to those listed above, such as compressor blades, heat shields, IGV structures, and duct members.

To provide a more specific example, consider the fabrication of nozzle vane 56 and/or rotor blade 64 utilizing manufacturing method 10 (FIG. 1). To produce vane 56 and/or blade 64, a sacrificial tooling structure is initially fabricated generally defining the desired shape and dimensions of the component. In the case of vane 56 and blade 64, both of these components include an airfoil structure or shape, which may be defined by a relatively thin-walled construction extending or wrapping about the perimeter of a central cavity within the airfoil. Thus, the contoured walls of nozzle vane 56 and/or rotor blade 64 may be produced by plating of the metallic body layer during electroforming, with the sacrificial tooling structure additively built to have an appropriate outer geometry defining the airfoil structures. After electroforming, the sacrificial tooling structure may be removed to form an internal cavity or void within nozzle vane 56 and/or rotor blade 64, as previously described in connection with FIG. 1 and as generally outlined in FIG. 7 by phantom line. The resulting vane 56 and blade 64 may each contain an airfoil portion that is defined, at least in substantial part, by a plated body layer corresponding to metallic body layer/shell 36 in FIGS. 4-6. The internal cavity within each of nozzle vane 56 and rotor blade 64 (again shown in phantom in FIG. 7) may be surrounded by the airfoil portion, as taken along a longitudinal axis of the airfoil portion, which is orthogonal to centerline 70 in FIG. 7. Such cavities may be left as unfilled air cavities to impart the finished component (here, vane 56 and/or blade 64) with a substantially hollow, lightweight construction well-suited for flight applications. Furthermore, if desired, impingement tubes or similar devices can be inserted into the cavities to provide targeted impingement cooling along, for example, the leading edge regions of vane 56 and/or rotor blade 64.

With continued reference to FIG. 7, openings providing access to the internal cavities contained in nozzle vane 56 and rotor blade 64 may be located inboard or outboard of the airfoil portion of vane 56 and/or blade 64, as taken along the longitudinal axis of the airfoil portion. In this manner, the openings through which the sacrificial tooling structures are removed do not penetrate or interrupt the contoured or aerodynamically-streamlined airfoil surfaces of nozzle vane 56 and rotor blade 64. In one embodiment, the opening providing access to the interior of the airfoil portion of nozzle vane 56 may be located in outer annular endwall 62 of turbine nozzle 58, as generally indicated in FIG. 7. Comparatively, the opening providing access to the interior of the airfoil portion of turbine rotor blade 64 may be provided through the platform or base portion of the rotor blade piece included in turbine rotor 66. Finally, when present and left intact through the performance of manufacturing method 10, the electrically-conductive coating layers may line the internal cavities of nozzle vane 56 and rotor blade 64, as further generically indicated by the dashed phantom lines shown in FIG. 7. The other non-illustrated turbine nozzle vanes and rotor blades contained within turbine nozzle 58 and turbine rotor 66, respectively, may be fabricated utilizing manufacturing method 10 in a similar or identical manner.

The metallic component or components fabricated utilizing manufacturing method 10 (FIG. 1) and contained within GTE 50 may possess one or more surfaces exposed to high temperature gas flow during engine operation (represented in FIG. 7 by arrows 72). In this case, it may be desirable to protect such surfaces with high temperature coatings, which afford added thermal barrier or environmental barrier protection to the underlying component bodies within the high temperature, chemically-harsh GTE environment. As indicated above, manufacturing method 10 may be utilized to fabricate GTE components including high temperature coatings, which are formed, at least in part, utilizing the electrically-conductive coating layers when present. To provide a more specific example in this regard, when manufacturing method 10 is utilized to fabricate a GTE component having a central opening serving as or defining one or more flow passages created by removal of the sacrificial tooling structure, the electrically-conductive coating layer can be utilized to form or help a high temperature coating or multilayer coating system over the surfaces of the GTE component defining or bounding the flow passage. Further illustrating this point, turbine rotor shroud 68 is shown in FIG. 7 as including such a high temperature coating 74, which bounds a flow passage provided through shroud 68 and which circumscribes turbine rotor 66. High temperature coating 74 can be produced, in whole or in part, from an electrically-conductive coating layer when manufacturing method 10 (FIG. 1) is utilized to produce turbine rotor shroud 68, as described more fully below.

One manner in which manufacturing method 10 can be utilized to produce turbine rotor shroud 68 is as follows. First, as explained above in conjunction with STEP 12 of manufacturing method 10 (FIG. 1), an AM process is utilized to produce a sacrificial tooling structure having a surface geometry generally defining the geometry of rotor shroud 68. In this particular example, the sacrificial tooling structure may be fabricated as a disc-shaped structure, the outer peripheral surface of which may have a geometry desirably transferred to the metallic body layer during electroforming. The sacrificial tooling structure also possesses flow passage-defining region in that removal of the tooling structure results in the formation of the flow passage, which extends through rotor shroud 68 in the manner generally shown in FIG. 7. An electrically-conductive coating layer is deposited over the outer periphery of the sacrificial tooling structure at a location generally corresponding to coating 74.

During the subsequently-performed electroforming process, the electrically-conductive coating layer is energized, while the sacrificial tooling structure is at least partially submerged in a plating bath to form a metallic body layer/ shell, which extends over the flow passage-defining region of the tooling structure. The metallic body layer/shell and, more generally, the resulting metallic component is imparted with a flow passage section through which gas flow is conducted during GTE operation. Additional tooling structure may also be positioned adjacent the central tooling structure to define flanges 76 or, instead, flanges 76 may be produced separately and subsequently attached to the annular body of shroud 68. After electroforming, build-up of the annular body of rotor shroud 68, and formation of the central opening or flow passage extending through shroud 68, the sacrificial tooling structure is thermally decomposed, chemically dissolved, or otherwise removed. Additional heat treatment is then be carried-out to transform the electrically-conductive coating layer into coating 74 (e.g., when assuming the form of an aluminide coating); or additional coating layers may be deposited over coating layer when serving as a (e.g., MCrAlY) bond coat to complete coating 74 (e.g., when assuming the form of a multilayer coating system).

CONCLUSION

The foregoing has thus provided unique, additive-based electroforming manufacturing methods, which enable the manufacture of metallic components with abbreviated cycle times and at reduced production costs as compared to conventional manufacturing methods. Advantageously, embodiments of the above-described manufacturing methods are amenable to the precision production of GTE components and other turbomachine components having relatively complex, thin-walled, hollow constructions. Additionally, embodiments of the above-described manufacturing methods facilitate the formation of high temperature coatings over selected component surfaces. Embodiments of the manufacturing methods may consequently be particularly useful in the fabrication of aerospace and turbomachine components, which have relatively thin-walled or shell-like constructions and which are predominately composed of superalloy materials; although the manufacturing methods described herein is not restricted to usage within any particular industry or to the production of any particular type of metallic component.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A method for manufacturing a metallic component, comprising:
   additively manufacturing a sacrificial tooling structure having a component-defining surface region;
   forming an electrically-conductive coating layer from an alloy predominately composed of aluminum by weight percentage over the component-defining surface region of the sacrificial tooling structure;
   applying a dielectric masking material to the sacrificial tooling structure, the dielectric masking material creating an opening in the metallic body layer during the electroforming process;
   depositing a metallic body layer over the electrically-conductive coating layer utilizing an electroforming process such that a geometry of the component-defining surface region is transferred to the metallic body layer;
   removing the sacrificial tooling structure through the opening created in the metallic body layer, while leaving the metallic body layer substantially intact, and the removing of the sacrificial tooling structure forms an internal void within the metallic body layer, and the electrically-conductive coating layer lines the internal void; and
   further processing the metallic body layer to complete fabrication of the metallic component, the further processing including heat treating the electrically-conductive coating layer substantially concurrently with the removing of the sacrificial tool structure to form an aluminide coating on the metallic body layer.

2. The method of claim 1 wherein the method further comprises:
   energizing the electrically-conductive coating layer during the electroforming process to deposit the metallic body layer over the electrically-conductive coating layer.

3. The method of claim 2 further comprising, during the electroforming process, depositing the metallic body layer to have a global average thickness exceeding that of the electrically-conductive coating layer.

4. The method of claim 1 wherein the metallic body layer forms a shell substantially enclosing the internal void.

5. The method of claim 4 wherein the shell has a substantially uniform wall thickness.

6. The method of claim 1 wherein the sacrificial tooling structure further has a non-component-defining surface region; and
   wherein the method further comprises producing the component-defining surface region from an electrically-conductive material, while producing the non-component-defining surface region from a dielectric material during the additive manufacturing method.

7. The method of claim 1 wherein the metallic component comprises an airfoil, and wherein the method further comprises shaping and sizing the sacrificial tooling structure to create the internal void within the airfoil when the sacrificial tooling structure is removed through the opening provided in the metallic body layer.

8. The method of claim 7 further comprising forming the opening at a location radially inboard or radially outboard of the airfoil.

9. The method of claim 1 wherein the metallic component comprises a gas turbine engine component having a flow passage therethrough, and wherein the method further comprises forming the flow passage, at least in substantial part, by removal of the sacrificial tooling structure.

10. A method for manufacturing a metallic article, comprising:
    applying an electrically-conductive coating layer from an alloy predominately composed of aluminum by weight percentage over a portion of a sacrificial tooling structure;
    applying a dielectric masking material to the sacrificial tooling structure;
    utilizing an electroforming process to deposit a metallic shell encasing the sacrificial tooling structure;
    in conjunction with the electroforming process, creating at least one opening in the metallic shell with the dielectric masking material through which the sacrificial tooling structure is exposed;
    removing the sacrificial tooling structure through the at least one opening to form an internal void within the metallic shell, and the electrically-conductive coating layer lines the internal void; and
    further processing the metallic shell to yield the metallic article, the further processing including heat treating the electrically-conductive coating layer substantially concurrently with the removing of the sacrificial tool structure to form an aluminide coating on the metallic body layer.

11. The method of claim 10 wherein the metallic article comprises a Gas Turbine Engine (GTE) component, and wherein the method further comprises:
   selecting the sacrificial tooling structure to have an airfoil-defining region; and
   forming the metallic shell to extend over the airfoil-defining region and define at least one airfoil contained within the GTE component.

12. The method of claim 10 wherein the metallic article comprises a GTE component, and wherein the method further comprises:
   selecting the sacrificial tooling structure to have a flow passage-defining region; and
   forming the metallic shell to extend over the flow passage-defining region and impart the metallic shell with a flow passage section through which gas flow is conducted when the GTE component is utilized within a GTE.

* * * * *